(12) United States Patent
Karube

(10) Patent No.: US 12,500,417 B2
(45) Date of Patent: Dec. 16, 2025

(54) POWER SUPPLY SYSTEM

(71) Applicant: SEKISUI HOUSE, LTD., Osaka (JP)

(72) Inventor: Motoyoshi Karube, Osaka (JP)

(73) Assignee: SEKISUI HOUSE, LTD., Osaka (JP)

( * ) Notice: Subject to any disclaimer, the term of this patent is extended or adjusted under 35 U.S.C. 154(b) by 0 days.

(21) Appl. No.: 18/852,178

(22) PCT Filed: Mar. 29, 2023

(86) PCT No.: PCT/JP2023/012999
§ 371 (c)(1),
(2) Date: Sep. 27, 2024

(87) PCT Pub. No.: WO2023/190772
PCT Pub. Date: Oct. 5, 2023

(65) Prior Publication Data
US 2025/0373016 A1    Dec. 4, 2025

(30) Foreign Application Priority Data
Mar. 30, 2022    (JP) .................................. 2022-056813

(51) Int. Cl.
*H02J 3/00*    (2006.01)
*H02J 3/38*    (2006.01)

(52) U.S. Cl.
CPC ............ *H02J 3/0075* (2020.01); *H02J 3/001* (2020.01); *H02J 3/38* (2013.01); *H02J 2300/24* (2020.01); *H02J 2300/30* (2020.01)

(58) Field of Classification Search
CPC .. H02J 3/0075; H02J 3/001; H02J 3/38; H02J 2300/24; H02J 2300/30
See application file for complete search history.

(56) References Cited

U.S. PATENT DOCUMENTS 9,559,521 B1 * 1/2017 King .......................... H02J 9/06
2009/0026841 A1    1/2009 Nakanishi
2012/0306270 A1    12/2012 Oh et al.

FOREIGN PATENT DOCUMENTS

JP    2012-254009 A    12/2012
JP    2014-64351 A     4/2014
(Continued)

OTHER PUBLICATIONS

International Search Report, issued in PCT/JP2023/012999, PCT/ISA/210, dated Jun. 20, 2023.
(Continued)

*Primary Examiner* — Daniel Cavallari
(74) *Attorney, Agent, or Firm* — Birch, Stewart, Kolasch & Birch, LLP

(57) ABSTRACT

An electric power supply system includes: a first electric power supply part that utilizes a commercial electric power supply source; a second electric power supply part that utilizes a vehicle battery or other supply source; a third electric power supply part that utilizes a fuel cell; a fourth electric power supply part that utilizes photovoltaic electric power generation; a first electric power supply line for supplying electric power to an important appliance group; a second electric power supply line for supplying electric power to a general appliance group; and a distribution board. The distribution board includes: a first switch to switch over the first electric power supply part and the second electric power supply part at an input; a second switch to switch over the third electric power supply part and an output of the first switch at an input, the second switch having an output connected to the first electric power supply line; and a third switch to switch over the fourth electric power supply part and the output of the first switch at an input, the third switch
(Continued)

having an output connected to the second electric power supply line.

8 Claims, 5 Drawing Sheets

(56) References Cited

FOREIGN PATENT DOCUMENTS

| | | |
|---|---|---|
| JP | 2021-78266 A | 5/2021 |
| JP | 2021-129331 A | 9/2021 |
| WO | WO2006/115201 A1 | 11/2006 |

OTHER PUBLICATIONS

Written Opinion of the International Searching Authority, issued in PCT/JP2023/012999, PCT/ISA/237, dated Jun. 20, 2023.

* cited by examiner

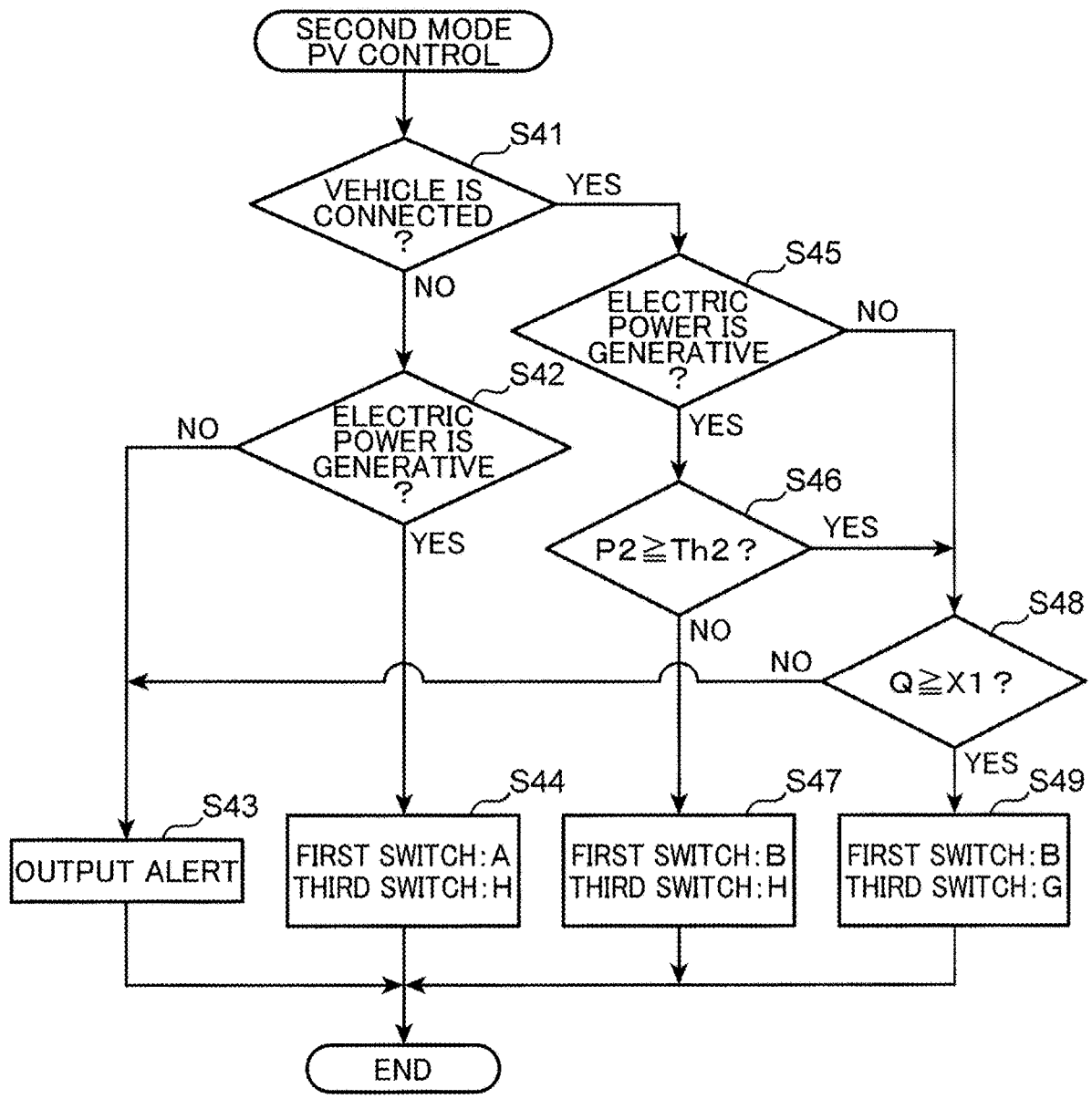

POWER SUPPLY SYSTEM

TECHNICAL FIELD

The present invention relates to an electric power supply system.

BACKGROUND ART

An electric power supply system disclosed in Patent Literature 1 includes a stationary electric power storage device including a lithium-ion battery and other components for supplying electric power charged in the stationary electric power storage device to electric appliances in a residence in a blackout or power outage.

Such a stationary electric power storage device including a lithium-ion battery and other components is very expensive. Indispensable requirement for the stationary electric power storage device as in the electric power supply system disclosed in Patent Literature 1 hence leads to an increase in the cost of introducing the system, and a failure at supplying electric power to electric appliances due to a decrease in a residual amount in the stationary electric power storage device. This is not satisfactory to meet an optimal electric power supply control for a user who chooses to stay home in an emergency like a blackout.

CITATION LIST

Patent Literature

Patent Literature 1: Japanese Unexamined Patent Publication No. 2014-64351

SUMMARY OF INVENTION

The present invention has an object of providing an electric power supply system that enables an optimal electric power supply control for a user in an emergency like a blackout without installation of a stationary electric power storage device.

An electric power supply system according to an aspect of the present invention includes: a first electric power supply part that utilizes a commercial electric power supply source; a second electric power supply part that utilizes a battery or an electric power generator mounted in a vehicle; a third electric power supply part that utilizes a fuel cell; a fourth electric power supply part that utilizes photovoltaic electric power generation; a first electric power supply line for supplying electric power to an important appliance group which is required to operate in an emergency including a blackout; a second electric power supply line for supplying electric power to a general appliance group which is not required to operate in the emergency; and a distribution board that puts each of the first to fourth electric power supply parts at an input and puts each of the first and second electric power supply lines at an output. The distribution board includes: a first switch to switch over the first electric power supply part and the second electric power supply part at an input; a second switch to switch over the third electric power supply part and an output of the first switch at an input, the second switch having an output connected to the first electric power supply line; and a third switch to switch over the fourth electric power supply part and the output of the first switch at an input, the third switch having an output connected to the second electric power supply line.

In a case where the vehicle is disconnected from the second electric power supply part in an emergency like a blackout, this configuration enables a supply of electric power from the third electric power supply part to the important appliance group by putting the third electric power supply part at the input of the second switch and enables a supply of electric power from the fourth electric power supply part to the general appliance group by putting the fourth electric power supply part at the input of the third switch. The configuration thus attains a reduction in the cost of introducing the system without installation of a stationary electric power storage device, and enables an optimal electric power supply control for a user in an emergency like a blackout. The third electric power supply part configured to utilize the fuel cell enables a stable supply of electric power to the important appliance group regardless of weather and a time. The fourth electric power supply part configured to utilize photovoltaic electric power generation which is available to supply an amount of electric power higher than that of a general fuel cell achieves reliable operation of a larger number of appliances in the general appliance group. In the case where the vehicle is connected to the second electric power supply part in an emergency like a blackout, the configuration enables a stable supply of a high amount of electric power from the vehicle to each of the important appliance group and the general appliance group by putting the second electric power supply part at the input of the first switch and connecting the output of the first switch to respective inputs of the second switch and the third switch. The system having this configuration is scalable enough to allow even a user having had no vehicle, such as an electric vehicle (EV) or a plug-in hybrid vehicle (PHV), at completion of a residence to have expectation for purchase of such a vehicle and a supply of electric power from the vehicle, and consequently achieves an optimal electric power supply control for the user.

This configuration further includes: a controller that executes a control of the switching over at the input of each of the first to third switches. The controller executes in a first mode being a control mode in the emergency: determining whether the vehicle is connected to the second electric power supply part; putting the third electric power supply part at the input of the second switch and putting the fourth electric power supply part at the input of the third switch, in a case where the vehicle is disconnected from the second electric power supply part; and putting the second electric power supply part at the input of the first switch, connecting the output of the first switch to the input of the second switch, and connecting the output of the first switch to the input of the third switch, in a case where the vehicle is connected to the second electric power supply part.

In the case where the vehicle is connected to the second electric power supply part, this configuration allows a user to select the first mode to enable a stable supply of a high amount of electric power from the vehicle to each of the important appliance group and the general appliance group in the set first mode. Alternatively, in the case where the vehicle is disconnected from the second electric power supply part, the configuration enables a stable supply of electric power to the important appliance group with the fuel cell and a supply of a high amount of electric power to a larger number of appliances in the general appliance group through photovoltaic electric power generation.

This configuration further includes: a controller that executes a control of the switching over at the input of each of the first to third switches. The controller executes in a second mode being a control mode in an emergency: determining whether the vehicle is connected to the second electric power supply part; putting the third electric power supply part at the input of the second switch and putting the fourth electric power supply part at the input of the third switch, in a case where the vehicle is disconnected from the second electric power supply part; and putting the second electric power supply part at the input of the first switch, putting the third electric power supply part at the input of the second switch, and putting the fourth electric power supply part at the input of the third switch, in a case where the vehicle is connected to the second electric power supply part.

This configuration allows the user to select the second mode, and prioritizes the third electric power supply part and the fourth electric power supply part over the second electric power supply part for the supply of electric power in the set second mode even in the case where the vehicle is connected to the second electric power supply part. This attains suppression of over-discharge of the vehicle battery or a reduction in the fuel consumption for driving the vehicle electric power generator in the vehicle.

In the configuration, the controller executes, in the case where the vehicle is connected to the second electric power supply part, connecting the output of the first switch to the input of the second switch when a consumed electric power amount in the first electric power supply line is equal to or higher than a first threshold.

In the case of supplying the electric power from the fuel cell to the important appliance group in the second mode, this configuration enables a stable supply of a high amount of electric power from the vehicle and achieves reliable operation of the important appliance group by connecting the output of the first switch to the input of the second switch when the consumed electric power amount of the important appliance group increases.

In the configuration, the controller executes, in the case where the vehicle is connected to the second electric power supply part and the output of the first switch is connected to the input of the second switch, putting the third electric power supply part at the input of the second switch, when a residual fuel amount of the vehicle is lower than a predetermined value, the consumed electric power amount in the first electric power supply line is lower than the first threshold, or a residual stored warm water amount accompanied by power generation of the fuel cell is lower than a predetermined value.

In the case of supplying the electric power from the vehicle to the important appliance group in the second mode, the configuration keeps the vehicle from running out of fuel by putting the third electric power supply part at the input of the second switch when the residual fuel amount of the vehicle is lower than the predetermined value. The configuration further attains suppression of over-discharge of the vehicle battery or a reduction in fuel consumption in the vehicle by putting the third electric power supply part at the input of the second switch when the consumed electric power amount of the important appliance group decreases. Besides, the configuration achieves preparation of warm water accompanied by electric power generation with the fuel cell by putting the third electric power supply part at the input of the second switch when the residual stored warm water amount is lower than the predetermined value.

In the configuration, the controller executes, in the case where the vehicle is connected to the second electric power supply part, connecting the output of the first switch to the input of the third switch when an electric power generative condition concerning the photovoltaic electric power generation is not satisfied or a consumed electric power amount in the second electric power supply line is equal to or higher than a second threshold.

In the case of supplying the electric power to the general appliance group through the photovoltaic electric power generation in the second mode, this configuration enables a stable supply of a high amount of electric power from the vehicle and achieves reliable operation of the general appliance group by connecting the output of the first switch to the input of the third switch when an electric power generative condition concerning the photovoltaic electric power generation is not dissatisfied in terms of weather or a time. The configuration further enables a stable supply of a high amount of electric power from the vehicle and achieves reliable operation of the general appliance group by connecting the output of the first switch to the input of the third switch when the consumed electric power amount of the general appliance group increases.

In the configuration, the controller executes, in the case where the vehicle is connected to the second electric power supply part and the output of the first switch is connected to the input of the third switch, putting the fourth electric power supply part at the input of the third switch when the electric power generative condition concerning the photovoltaic electric power generation is satisfied and the consumed electric power amount in the second electric power supply line is lower than the second threshold.

In the case of supplying electric power from the vehicle to the general appliance group in the second mode, this configuration attains suppression of over-discharge of the vehicle battery or a reduction in the fuel consumption in the vehicle by putting the fourth electric power supply part at the input of the third switch when the electric power generative condition concerning the photovoltaic electric power generation is satisfied in terms of weather or a time. The configuration further attains suppression of over-discharge of the vehicle battery or a reduction in fuel consumption in the vehicle by putting the fourth electric power supply part at the input of the third switch when the consumed electric power amount of the general appliance group decreases.

The configuration further includes an output device configured to output an alert. In the case where the vehicle is connected to the second electric power supply part and the output of the first switch is connected to the input of the third switch, the controller causes the output device to output the alert to instruct suspension of supplying the electric power to the second electric power supply line when a residual fuel amount of the vehicle is lower than a predetermined value.

In the case of supplying the electric power from the vehicle to the general appliance group in the second mode, this configuration keeps the vehicle from running out of fuel by suspending the supply of the electric power to the general appliance group when the residual fuel amount of the vehicle is lower than the predetermined value. The output device is configured to output an alert outputs the alert to notify the user of suspension of supplying the electric power to the general appliance group.

BRIEF DESCRIPTION OF DRAWINGS

FIG. 5 is a flowchart showing contents of processing to be executed by a controller.

DESCRIPTION OF EMBODIMENTS

Figure 1:
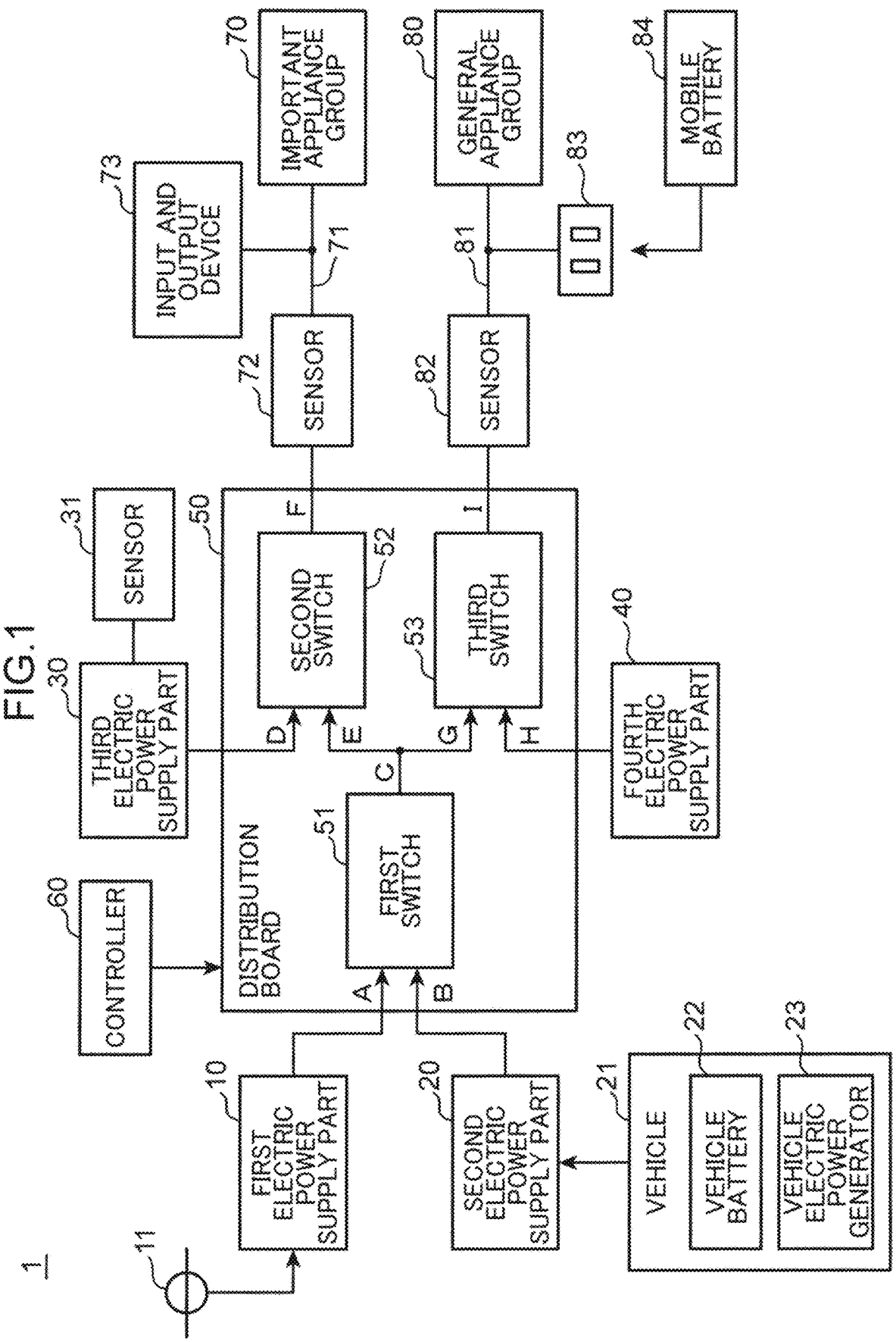
FIG. 1 is a schematic diagram of a configuration of an electric power supply system according to an embodiment of the present invention.

Hereinafter, an embodiment of the present invention will be described with reference to the accompanying drawings. The elements given the same reference numerals in different drawings are defined to be the same or corresponding elements.

FIG. 1 is a schematic diagram of a configuration of an electric power supply system 1 according to the embodiment of the present invention. The electric power supply system 1 according to the embodiment is established as a residential electric power supply system in a residence where a user lives. The residential electric power supply system is one example of the electric power supply system 1. Applicable targets for the electric power supply system 1 according to the present invention include factories, commercial facilities, or public facilities.

Electric appliances arranged in the residence are classified into an important appliance group 70 and a general appliance group 80.

The important appliance group 70 represents an electric appliance group which is required to operate even in an emergency like a blackout and includes, for example, a lighting device, a television, a refrigerator, or an outlet or a socket, each provided in a living, dining, and kitchen (LDK) room, or other place. The important appliance group 70 receives a supply of electric power for driving via a first electric power supply line 71. A sensor 72 is connected to the first electric power supply line 71. The sensor 72 detects a consumed electric power amount of a whole of the important appliance group 70 by measuring an electric current value, a voltage value, or other value. An input and output device 73 is further connected to the first electric power supply line 71. The input and output device 73 is, for example, a touch screen display provided in the LDK room. Alternatively, an input device and an output device may be individually provided. The input device may be a mouse, a keyboard, or other device, and the output device may be a television, a speaker, or other output device.

The general appliance group 80 represents an appliance group which is not required to operate in an emergency like a blackout, and includes a lighting device, a television, or an outlet provided in a bedroom, at a hallway, or in other place. The general appliance group 80 receives a supply of electric power for driving via a second electric power supply line 81. A sensor 82 is connected to the second electric power supply line 81. The sensor 82 detects a consumed electric power amount of a whole of the general appliance group 80 by measuring an electric current value, a voltage value, or other value. An outlet 83 for an emergency is connected to the second electric power supply line 81. Connecting an output terminal of a mobile battery 84 having a large capacity to the outlet 83 allows a supply of electric power from the mobile battery 84 to the general appliance group 80 via the second electric power supply line 81.

The electric power supply system 1 includes a first electric power supply part 10 that utilizes a commercial electric power supply source 11, a second electric power supply part 20 that utilizes a vehicle battery 22 or a vehicle electric power generator 23 mounted in a vehicle 21, a third electric power supply part 30 that utilizes a fuel cell, and a fourth electric power supply part 40 that utilizes photovoltaic electric power generation. The vehicle 21 is an EV, a PHV, or other vehicle. The embodiment shows an example where respective electric power output amounts from the electric power supply parts are defined to satisfy the relation "the second electric power supply part 20>the fourth electric power supply part 40>the third electric power supply part 30".

The electric power supply system 1 includes a distribution board 50. The distribution board 50 includes: a first switch 51 having input terminals A and B, and an output terminal C; a second switch 52 having input terminals D and E, and an output terminal F; and a third switch 53 having input terminals G and H, and an output terminal I.

The distribution board 50 puts each of the first electric power supply part 10, the second electric power supply part 20, the third electric power supply part 30, and the fourth electric power supply part 40 at an input, and puts each of the first electric power supply line 71 and the second electric power supply line 81 at an output.

The input terminal A of the first switch 51 is connected to the first electric power supply part 10 and the input terminal B thereof is connected to the second electric power supply part 20. The first switch 51 is configured to switch over the first electric power supply part 10 and the second electric power supply part 20 at an input.

The input terminal D of the second switch 52 is connected to the third electric power supply part 30, the input terminal E thereof is connected to the output terminal C of the first switch 51, and the output terminal F thereof is connected to the first electric power supply line 71. The second switch 52 is configured to switchover the third electric power supply part 30 and the output terminal C of the first switch 51 at an input.

The input terminal G of the third switch 53 is connected to the output terminal C of the first switch 51, the input terminal H thereof is connected to the fourth electric power supply part 40, and the output terminal I thereof is connected to the second electric power supply line 81. The third switch 5 is configured to switch over the fourth electric power supply part 40 and the output terminal C of the first switch 51 at an input.

The first electric power supply part 10 includes a typical distribution board, and supplies electric power from the commercial electric power supply source 11 to the input terminal A of the first switch 51.

The second electric power supply part 20 includes a waterproof outlet located outside the residence and supplies electric power from the vehicle 21 to the input terminal B of the first switch 51.

The third electric power supply part 30 includes a fuel cell electric power generator utilizing natural gas, and supplies generated electric power to the input terminal D of the second switch 52. The third electric power supply part 30 further includes a sensor 31 that detects a residual stored warm water amount in a warm water storage tank that stores the warm water prepared through electric power generation by the fuel cell electric power generator. The electric power may be supplied from the third electric power supply part 30 to the first electric power supply part 10 in a normal state without an emergency like a blackout.

The fourth electric power supply part 40 includes a photovoltaic electric power generator utilizing a photovoltaic panel, and supplies generated electric power to the input terminal H of the third switch 53. The electric power may be supplied from the fourth electric power supply part 40 to the first electric power supply part 10 in a normal state without an emergency like a blackout.

The electric power supply system 1 includes a controller 60 connected to the distribution board 50. The controller 60 is composed of a microcomputer or other computer, and executes a control of the switching over at the input of each of the first switch 51, the second switch 52, and the third switch 53. The controller 60 is mutually communicable with the first electric power supply part 10, the second electric power supply part 20, the third electric power supply part 30, the fourth electric power supply part 40, the sensors 31, 72, 82, and the input and output device 73 via an appropriate wireless or wired communication network. The controller 60 drives with an uninterruptible power supply source, a dry battery, or other power source. The switching over at the input of each of the first switch 51, the second switch 52, and the third switch 53 may be executed through manipulation by the operator with a physical switch, such as a dip switch, on the distribution board 50 in place of execution through automatic control by the controller 60.

Each of FIG. 2 to FIG. 5 is a flowchart showing contents of a process or processing to be executed by the controller 60.

Figure 2:
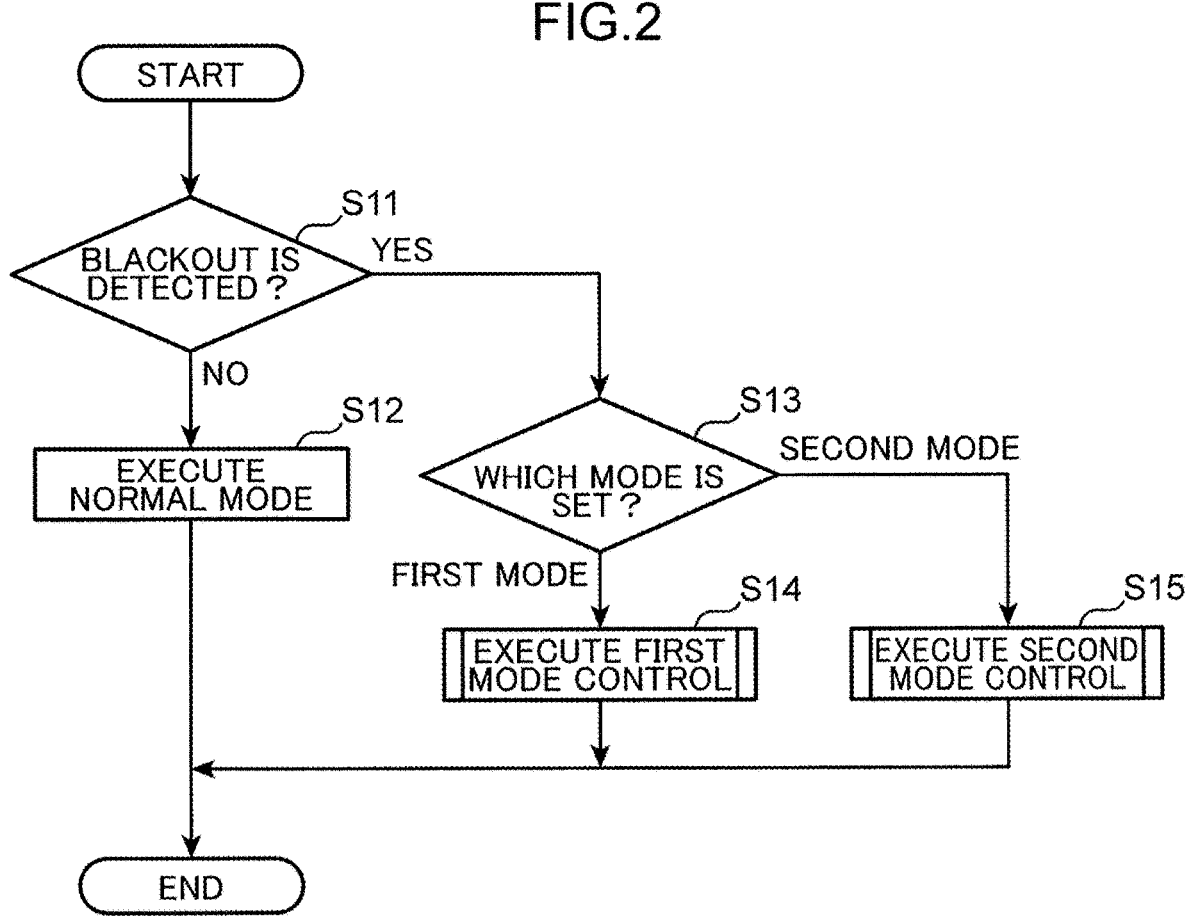
FIG. 2 is a flowchart showing contents of a process to be executed by a controller.

Referring to FIG. 2, first, the controller 60 determines, in step S11, whether a blackout is detected. The controller 60 determines whether a blackout occurs, on the basis of a result of measuring a voltage of the commercial electric power supply source 11 from the first electric power supply part 10.

When no blackout is detected (NO in step S11), the controller 60 subsequently executes a normal mode in step S12. In the normal mode, the controller 60 puts the first electric power supply part 10 at the input of the first switch 51, connects an output of the first switch 51 to the input of the second switch 52, and connects the output of the first switch 51 to the input of the third switch 53. This enables a supply of electric power from the commercial electric power supply source 11 to each of the important appliance group 70 and the general appliance group 80. When a blackout is detected (YES in step S11), the controller 60 disconnects the first electric power supply part 10 from the commercial electric power supply source 11 to ensure safety. Thereafter, the controller 60 determines, in step S13, which of a first mode and a second mode is set as a control mode in the blackout. The first mode is a mode of prioritizing a supply of electric power from the vehicle 21, and the second mode is a mode of prioritizing a supply of electric power with a fuel cell and through photovoltaic electric power generation. The user inputs mode selection information in advance by using the input and output device 73. The controller 60 makes an internal memory store the mode selection information received from the input and output device 73.

Figure 3:
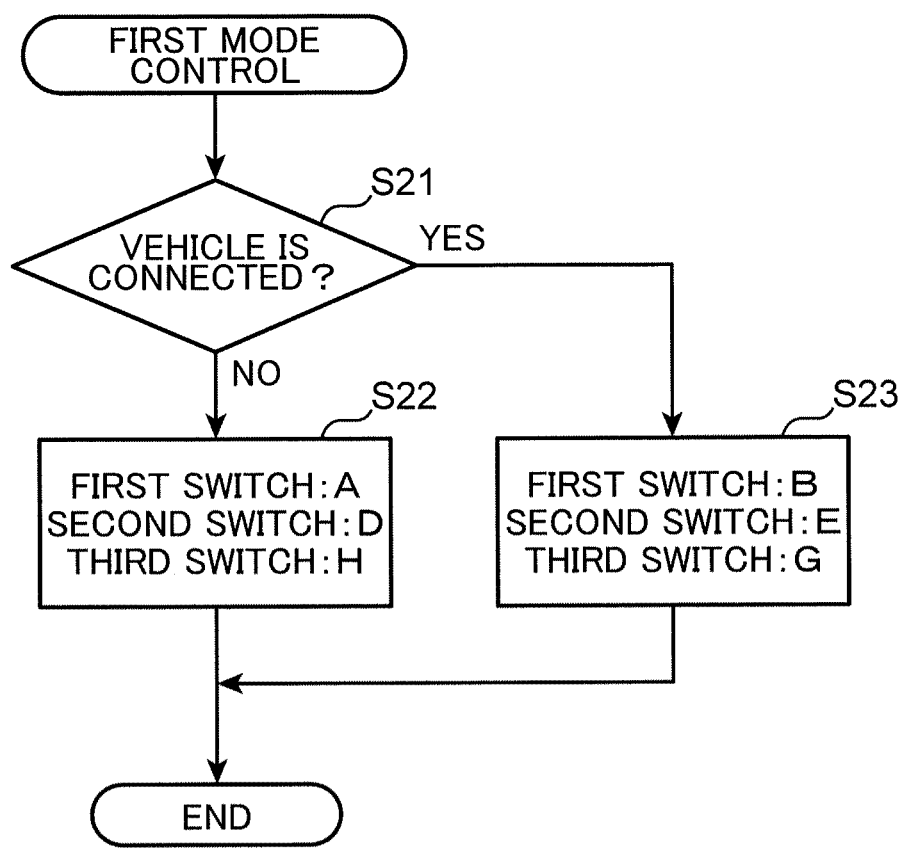
FIG. 3 is a flowchart showing contents of processing to be executed by a controller.

When the control mode in the blackout is set to the first mode, the controller 60 executes, in step S14, a first mode control shown in FIG. 3.

Figure 4:
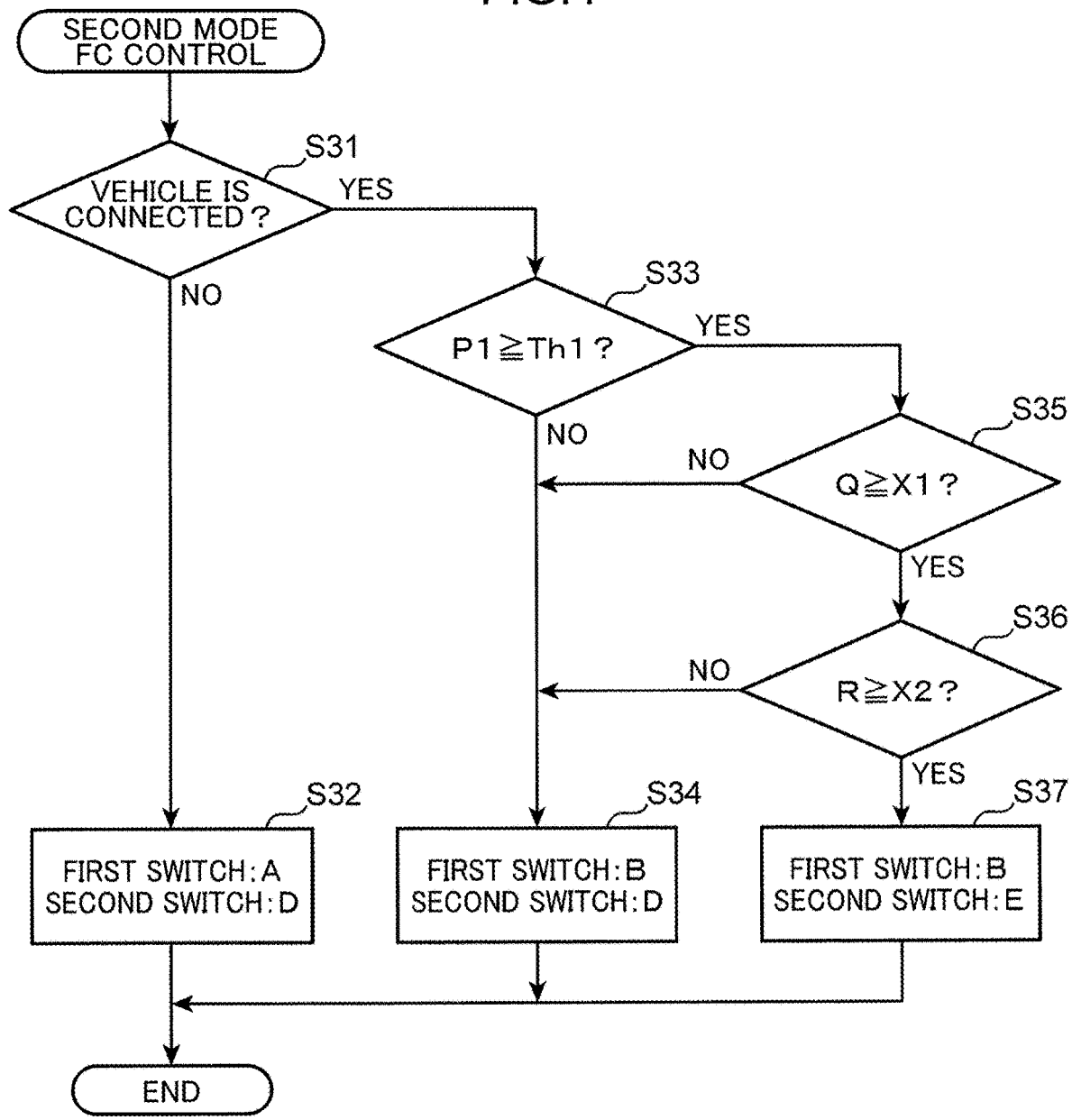
FIG. 4 is a flowchart showing contents of processing to be executed by a controller.

When the control mode in the blackout is set to the second mode, the controller 60 executes, in step S15, a second mode control shown in each of FIG. 4 and FIG. 5. FIG. 4 shows a second mode FC control related to a fuel cell (FC) and belonging to the second mode control, and FIG. 5 shows a second mode PV control related to photovoltaic electric power generation (PV) and belonging to the second mode control.

The controller 60 repeats the process shown in FIG. 2 at predetermined minute time intervals.

Referring to FIG. 3, when the first mode is set as the control mode in the blackout, first, the controller 60 determines, in step S21, whether the vehicle 21 is connected to the second electric power supply part 20. The controller 60 determines connection or disconnection of the vehicle 21 on the basis of a result of measuring a predetermined internal voltage of the second electric power supply part 20 from the second electric power supply part 20.

In the case where the vehicle 21 is disconnected from the second electric power supply part 20 (NO in step S21), the controller 60 subsequently connects, in step S22, the input terminal (puts the first electric power supply part 10) at the input of the first switch 51 to ensure the safety. The controller 60 connects the input terminal D (puts the third electric power supply part 30) at the input of the second switch 52 and connects the input terminal H (puts the fourth electric power supply part 40) at the input of the third switch 53. This enables a stable supply of electric power from the third electric power supply part 30 to the important appliance group 70 with the fuel cell, and a supply of a high amount of electric power from the fourth electric power supply part 40 to a larger number of appliances in the general appliance group 80 through the photovoltaic electric power generation.

In contrast, in the case where the vehicle 21 is connected to the second electric power supply part 20 (YES in step S21), the controller 60 connects the input terminal B (puts the second electric power supply part 20) at the input of the first switch 51, connects the input terminal E at (connects the output terminal C of the first switch 51 to) the input of the second switch 52, and connects the input terminal G at (connects the output terminal C of the first switch 51 to) the input of the third switch 53. This enables a stable supply of a high amount of electric power from the vehicle 21 to each of the important appliance group 70 and the general appliance group 80.

Referring to FIG. 4, in the second mode set as the control mode in the blackout, first, the controller 60 determines, in step S31, whether the vehicle 21 is connected to the second electric power supply part 20. The controller 60 determines connection or disconnection of the vehicle 21 on the basis of a result of measuring a predetermined internal voltage of the second electric power supply part 20 from the second electric power supply part 20.

In the case where the vehicle 21 is disconnected from the second electric power supply part 20 (NO in step S31), the controller 60 subsequently connects, in step S32, the input terminal A (puts the first electric power supply part 10) at the input of the first switch 51 to ensure the safety. The controller 60 connects the input terminal D (puts the third electric power supply part 30) at the input of the second switch 52. This enables a stable supply of electric power from the third electric power supply part 30 to the important appliance group 70 with the fuel cell.

In the case where the vehicle 21 is connected to the second electric power supply part 20 (YES in step S31), the controller 60 subsequently determines, in step 33, whether a consumed electric power amount P1 in the first electric power supply line 71 (of the important appliance group 70) from the sensor 72 is equal to or higher than a first threshold Th1. The first threshold Th1 is set to, for example, a value which is slightly lower than a maximal output electric power amount from the third electric power supply part 30. The first threshold Th1 may be set to an appropriate numerical value on the basis of a daily use electric power amount of the important appliance group 70 by the user in a normal state without an emergency like a blackout. It may be determined whether the consumed electric power amount P1 has a tendency to increase before the execution of step S33, and step S33 may be executed under the condition of the determination on the tendency to increase.

When the consumed electric power amount P1 is lower than the first threshold Th1 (NO in step S33), the controller 60 connects the input terminal B (puts the second electric power supply part 20) at the input of the first switch 51 and connects the input terminal D (puts the third electric power supply part 30) at the input of the second switch 52, in step S34. This enables a stable supply of electric power from the third electric power supply part 30 to the important appliance group 70 with the fuel cell. Besides, switching over from the output terminal C of the first switch 51 to the third electric power supply part 30 at the input of the second switch 52 in a decrease in the consumed electric power amount of the important appliance group 70 attains suppression of over-discharge of the vehicle battery 22 or a reduction in fuel consumption in the vehicle 21.

When the consumed electric power amount P1 is equal to or higher than the first threshold Th1 (YES in step S33), the controller 60 determines, in step S35, whether a residual fuel amount Q of the vehicle 21 is equal to or higher than a predetermined value X1. Information indicating the residual fuel amount Q is transmitted from the vehicle 21 to the second electric power supply part 20, and the controller 60 receives the information from the second electric power supply part 20. The predetermined value X1 is set to, for example, a value corresponding to a running distance of several tens kilometers.

When the residual fuel amount Q is equal to or higher than the predetermined value X1 (YES in step S35), the controller 60 determines, in step S36, whether a residual stored warm water amount R received from the sensor 31 is equal to or higher than a predetermined value X2. The predetermined value X2 is set to, for example, a value corresponding to a warm water amount used in taking a shower at several times.

When the residual stored warm water amount R is equal to or higher than the predetermined value X2 (YES in step S36), the controller 60 connects the input terminal B (puts the second electric power supply part 20) at the input of the first switch 51 and connects the input terminal E at (connects the output terminal C of the first switch 51 to) the input of the second switch 52, in step S37. This enables a stable supply of a high amount of electric power from the vehicle 21 and achieves reliable operation of the important appliance group 70.

When the residual fuel amount Q is lower than the predetermined value X1 (NO in step S35), the controller 60 connects the input terminal B (puts the second electric power supply part 20) at the input of the first switch 51 and connects the input terminal D (puts the third electric power supply part 30) at the input of the second switch 52, in step S34. This keeps the vehicle 21 from running out of fuel.

When the residual stored warm water amount R is lower than the predetermined value X2 (NO in step S36), the controller 60 connects the input terminal B (puts the second electric power supply part 20) at the input of the first switch 51 and connects the input terminal D (puts the third electric power supply part 30) at the input of the second switch 52, in step S34. This enables preparation of warm water accompanied by electric power generation with the fuel cell.

Referring to FIG. 5, in the second mode set as the control mode in the blackout, first, the controller 60 determines, in step S41, whether the vehicle 21 is connected to the second electric power supply part 20. The controller 60 determines connection or disconnection of the vehicle 21 on the basis of a result of measuring a predetermined internal voltage of the second electric power supply part 20 from the second electric power supply part 20.

In the case where the vehicle 21 is disconnected from the second electric power supply part 20 (No in step S41), the controller 60 subsequently determines, in step S42, whether an electric power generative condition concerning the photovoltaic power generation is satisfied. The controller 60 determines whether the photovoltaic electric power generation is available on the basis of weather information, time information, and other information from a server device or other device via a communication network.

When the electric power generative condition concerning the photovoltaic electric power generation is not satisfied (NO in step S42), the controller 60 transmits an alert instruction to the input and output device 73 and causes the input and output device 73 to output an alert to instruct suspension of supplying the electric power to the second electric power supply line 81 (the general appliance group 80), in step S43. An output way may be displaying of a character or a shape onto a screen, or outputting of a sound or voice from a speaker. The alert may include a message encouraging movement to an area (e.g., the LDK room) where the important appliance group 70 is arranged in the residence. Alternatively, the alert may include a message encouraging connection of the mobile battery 84 to the outlet 83.

When the electric power generative condition concerning the photovoltaic electric power generation is satisfied (YES in step S42), the controller 60 connects, in step S44, the input terminal A (puts the first electric power supply part 10) at the input of the first switch 51 to ensure safety. The controller 60 connects the input terminal H (puts the fourth electric power supply part 40) at the input of the third switch 53. This enables a supply of a high amount of electric power from the fourth electric power supply part 40 to the general appliance group 80 through the photovoltaic electric power generation.

In the case where the vehicle 21 is connected to the second electric power supply part 20 (YES in step S41), the controller 60 determines, in step S45, whether an electric power generative condition concerning the photovoltaic power generation is satisfied. The controller 60 determines whether the photovoltaic electric power generation is available on the basis of weather information, time information, and other information from a server device or other device via a communication network.

When the electric power generative condition concerning the photovoltaic electric power generation is satisfied (YES in step S45), the controller 60 determines, in step S46, whether a consumed electric power amount P2 in the second electric power supply line 81 (of the general appliance group 80) from the sensor 82 is equal to or higher than a second threshold Th2. The second threshold Th2 is set to, for example, a value which is slightly lower than a maximal output electric power amount from the fourth electric power supply part 40. The second threshold Th2 may be set to an appropriate numerical value on the basis of a daily use electric power amount of the general appliance group 80 by the user in a normal state without an emergency like a blackout.

When the consumed electric power amount P2 is lower than the second threshold Th2 (NO in step S46), the controller 60 connects the input terminal B (puts the second electric power supply part 20) at the input of the first switch 51 and connects the input terminal H (puts the fourth electric power supply part 40) at the input of the third switch 53, in step S47. This enables a supply of a high amount of electric power from the fourth electric power supply part 40 to the general appliance group 80 through the photovoltaic electric power generation. Switching over from the output terminal C of the first switch 51 to the fourth electric power supply part 40 at the input of the third switch 53 in a decrease in the consumed electric power amount of the general appliance group 80 attains suppression of over-discharge of the vehicle battery 22 or a reduction in fuel consumption in the vehicle 21.

When the electric power generative condition concerning the photovoltaic electric power generation is not satisfied (NO in step S45) or the consumed electric power amount P2 is equal to or higher than the second threshold Th2 (YES in step S46), the controller 60 determines, in step S48, whether the residual fuel amount Q of the vehicle 21 is equal to or higher than the predetermined value X1. Information indicating the residual fuel amount Q is transmitted from the vehicle 21 to the second electric power supply part 20, and the controller 60 receives the information from the second electric power supply part 20. The predetermined value X1 is set to, for example, a value corresponding to a running distance of several tens kilometers.

When the residual fuel amount Q is equal to or higher than the predetermined value X1 (YES in step S48), the controller 60 connects the input terminal B (puts the second electric power supply part 20) at the input of the first switch 51 and connects the input terminal G at (connects the output terminal C of the first switch 51 to) the input of the third switch 53, in step S49. This enables a stable supply of a high amount of electric power from the vehicle 21 and achieves a reliable operation of the general appliance group 80.

When the residual fuel amount Q is lower than the predetermined value X1 (No in step S48), the controller 60 transmits an alert instruction to the input and output device 73 and causes the input and output device 73 to output an alert to instruct suspension of supplying the electric power to the second electric power supply line 81 (the general appliance group 80), in step S43. An output way may be displaying of a character or a shape onto a screen, or outputting of a sound or voice from a speaker. The alert may include a message encouraging movement to an area (e.g., the LDK room) where the important appliance group 70 is arranged in the residence.

Alternatively, the alert may include a message encouraging connection of the mobile battery 84 to the outlet 83.

The electric power supply system 1 according to the embodiment enables, in the case where the vehicle 21 is disconnected from the second electric power supply part 20 in an emergency like a blackout, a supply of electric power from the third electric power supply part 30 to the important appliance group 70 by putting the third electric power supply part 30 at the input of the second switch 52 and a supply of electric power from the fourth electric power supply part 40 to the general appliance group 80 by putting the fourth electric power supply part 40 at the input of the third switch 53. The configuration thus attains a reduction in the cost of introducing the system without installation of a stationary electric power storage device, and enables an optimal electric power supply control for a user in an emergency like a blackout.

The third electric power supply part 30 configured to utilize the fuel cell enables a stable supply of electric power to the important appliance group 70 regardless of weather and a time. The fourth electric power supply part 40 configured to utilize photovoltaic electric power generation which is available to supply an amount of electric power higher than that of a general fuel cell achieves reliable operation of a larger number of appliances in the general appliance group 80.

In the case where the vehicle 21 is connected to the second electric power supply part 20 in an emergency like a blackout, the system enables a stable supply of a high amount of electric power from the vehicle 21 to each of the important appliance group 70 and the general appliance group 80 by putting the second electric power supply part 20 at the input of the first switch 51 and connecting the output terminal C of the first switch 51 to the respective inputs of the second switch 52 and the third switch 53. The system including this configuration is scalable enough to allow even a user having had no vehicle 21, such as an EV or a PHV, at completion of a residence to have expectation for purchase of such a vehicle 21 and a supply of electric power from the vehicle 21, and consequently achieves an optimal electric power supply control for the user.

The invention claimed is:

1. An electric power supply system, comprising:
   a first electric power supply part that utilizes a commercial electric power supply source;
   a second electric power supply part that utilizes a battery or an electric power generator mounted in a vehicle;
   a third electric power supply part that utilizes a fuel cell;
   a fourth electric power supply part that utilizes photovoltaic electric power generation;
   a first electric power supply line for supplying electric power to an important appliance group which is required to operate in an emergency including a blackout;
   a second electric power supply line for supplying electric power to a general appliance group which is not required to operate in the emergency; and
   a distribution board that puts each of the first to fourth electric power supply parts at an input and puts each of the first and second electric power supply lines at an output, wherein
   the distribution board includes:
      a first switch to switch over the first electric power supply part and the second electric power supply part at an input;
      a second switch to switch over the third electric power supply part and an output of the first switch at an input, the second switch having an output connected to the first electric power supply line; and
      a third switch to switch over the fourth electric power supply part and the output of the first switch at an input, the third switch having an output connected to the second electric power supply line.

2. The electric power supply system according to claim 1, further comprising a controller that executes a control of the switching over at the input of each of the first to third switches, wherein
   the controller executes in a first mode being a control mode in the emergency:
      determining whether the vehicle is connected to the second electric power supply part;
      putting the third electric power supply part at the input of the second switch and putting the fourth electric power supply part at the input of the third switch, in a case where the vehicle is disconnected from the second electric power supply part; and
      putting the second electric power supply part at the input of the first switch, connecting the output of the first switch to the input of the second switch, and connecting the output of the first switch to the input of the third switch, in a case where the vehicle is connected to the second electric power supply part.

3. The electric power supply system according to claim 1, further comprising a controller that executes a control of the switching over at the input of each of the first to third switches, wherein the controller executes in a second mode being a control mode in an emergency:
- determining whether the vehicle is connected to the second electric power supply part;
- putting the third electric power supply part at the input of the second switch and putting the fourth electric power supply part at the input of the third switch, in a case where the vehicle is disconnected from the second electric power supply part; and
- putting the second electric power supply part at the input of the first switch, putting the third electric power supply part at the input of the second switch, and putting the fourth electric power supply part at the input of the third switch, in a case where the vehicle is connected to the second electric power supply part.

4. The electric power supply system according to claim 3, wherein the controller executes, in the case where the vehicle is connected to the second electric power supply part, connecting the output of the first switch to the input of the second switch when a consumed electric power amount in the first electric power supply line is equal to or higher than a first threshold.

5. The electric power supply system according to claim 4, wherein the controller executes, in the case where the vehicle is connected to the second electric power supply part and the output of the first switch is connected to the input of the second switch, putting the third electric power supply part at the input of the second switch, when a residual fuel amount of the vehicle is lower than a predetermined value, the consumed electric power amount in the first electric power supply line is lower than the first threshold, or a residual stored warm water amount accompanied by power generation of the fuel cell is lower than a predetermined value.

6. The electric power supply system according to claim 3, wherein the controller executes, in the case where the vehicle is connected to the second electric power supply part, connecting the output of the first switch to the input of the third switch when an electric power generative condition concerning the photovoltaic electric power generation is not satisfied or a consumed electric power amount in the second electric power supply line is equal to or higher than a second threshold.

7. The electric power supply system according to claim 6, wherein the controller executes, in the case where the vehicle is connected to the second electric power supply part and the output of the first switch is connected to the input of the third switch, putting the fourth electric power supply part at the input of the third switch when the electric power generative condition concerning the photovoltaic electric power generation is satisfied and the consumed electric power amount in the second electric power supply line is lower than the second threshold.

8. The electric power supply system according to claim 6, further comprising an output device configured to output an alert, wherein, in the case where the vehicle is connected to the second electric power supply part and the output of the first switch is connected to the input of the third switch, the controller causes the output device to output the alert to instruct suspension of supplying the electric power to the second electric power supply line when a residual fuel amount of the vehicle is lower than a predetermined value.

* * * * *